United States Patent [19]

Watanabe

[11] 4,368,568

[45] Jan. 18, 1983

[54] ELASTOMERIC MATERIAL COVERED ROLLS AND A METHOD OF MAKING THE SAME

[75] Inventor: Atsuo Watanabe, Kyoto, Japan

[73] Assignee: Yamauchi Rubber Industry Co., Ltd., Osaka, Japan

[21] Appl. No.: 174,244

[22] Filed: Jul. 31, 1980

[30] Foreign Application Priority Data

Aug. 10, 1979 [JP]  Japan ................. 54-102607

[51] Int. Cl.³ ............................................. B21B 31/08
[52] U.S. Cl. ......................................... 29/130; 29/132
[58] Field of Search ................ 29/130, 132, 110, 127, 29/131

[56] References Cited

U.S. PATENT DOCUMENTS

| | | | |
|---|---|---|---|
| 2,804,678 | 9/1957 | Rockoff | 29/130 X |
| 3,662,446 | 5/1972 | Walls | 29/130 |
| 3,707,752 | 1/1973 | Brafford et al. | 29/132 |
| 3,737,963 | 6/1973 | Postulka et al. | 29/130 |

*Primary Examiner*—Peter P. Nerbun
*Attorney, Agent, or Firm*—Hubbell, Cohen, Stiefel & Gross

[57] ABSTRACT

A polyurethane rubber covered roll comprises a metallic roll core, a reinforcing layer adhering to the outer surface of the roll core, and formed by a nonwoven fabric impregnated with a mixture of a thermosetting resin and a fine inorganic powder, and a layer of polyurethane rubber united integrally with the outer surface of the reinforcing layer. The roll is useful when used, for example, in a paper machine.

23 Claims, 6 Drawing Figures

ELASTOMERIC MATERIAL COVERED ROLLS AND A METHOD OF MAKING THE SAME

BACKGROUND OF THE INVENTION

1. Field of the Invention

This invention relates to elastomeric material covered rolls for use in various fields of industry, such as papermaking, ironmaking and textile manufacture. More particularly, it is concerned with an elastomeric material covered roll adapted for use under a heavy load at a high speed of rotation, and comprising a metallic roll core, a reinforcing layer of at least one nonwoven fabric impregnated with a thermosetting resin and a fine inorganic powder and surrounding the roll core, and a layer of elastomeric material, such as polyurethane rubber, surrounding the reinforcing layer. This invention also relates to a method of making those rolls.

2. Description of the Prior Art

There is known a roll comprising a roll core, a reinforcing layer of fibrous yarns impregnated with a thermosetting resin, such as an epoxy or unsaturated polyester resin, and wound around the roll core, and a polyurethane rubber layer formed around the reinforcing layer by casting, as disclosed, for example, in Japanese Patent Publication No. 19814/1973. The reinforcing layer, however, contains a relatively small proportion of the thermosetting resin, which is only about a half in weight of the fibrous yarns. Therefore, the reinforcing layer has a low compressive strength leading to a low surface strength of the polyurethane rubber layer. The fibrous yarns extend in parallel to the circumference of roll core, or at an angle thereto. When the roll is rotated at a high speed under a heavy load, the reinforcing layer is likely to crack along the fibrous yarns, and the cracks grow easily, resulting in the breaking of the reinforcing layer.

Particularly, if such breaking of the reinforcing layer occurs in the vicinity of its boundary with the rubber layer, the rubber layer cannot remain fixed firmly, but often comes off the roll core. Thus, the durability of the known roll is far from being satisfactory. For example, when a roll having a reinforcing layer of the nature as described above was rotated at a speed of 200 rpm under a load of 200 kg/cm$^2$, the reinforcing layer had a broken surface after 20 to 30 hours, resulting in the stripping of the rubber layer.

It has also been proposed to use a cloth of fibers impregnated with a resin instead of, or in addition to the aforementioned resin impregnated fibrous yarns (U.S. Pat. Nos. 3,490,119, 3,520,747 and 3,646,651, and Japanese Patent Publication No. 39869/1972). These rolls are, however, unsatisfactory, too, in durability and other aspects.

SUMMARY OF THE INVENTION

It is an object of this invention to provide an elastomeric material covered roll having an improved resin impregnated fibrous reinforcing layer on the surface of a roll core, thereby reducing or eliminating the aforementioned drawbacks of the known rolls, and having an improved durability.

The roll of this invention comprises a metallic roll core having a roughened surface, an elastomeric material layer, and a thermosetting resin impregnated fibrous reinforcing layer disposed between the roll core and the elastomeric material layer, and including at least one nonwoven fabric layer impregnated with a mixture of a thermosetting resin and a fine inorganic powder, and united integrally with the elastomeric material layer thereunder.

The fibrous reinforcing layer preferably comprises an inner first reinforcing layer contacting the outer surface of the roll core and united integrally therewith, and an outer second reinforcing layer having an outer surface connected integrally with the elastomeric material layer. The first reinforcing layer includes at least one layer composed of a cloth of inorganic fibers impregnated with a thermosetting resin or a mixture thereof with an inorganic powder, while the second reinforcing layer is formed by a nonwoven fabric impregnated substantially uniformly with a mixture of a thermosetting resin and a fine inorganic powder.

According to another aspect of this invention, the first reinforcing layer preferably comprises an inner layer formed by a cloth of inorganic fibers contacting the outer surface of the roll core and united integrally therewith, and an outer layer formed by rovings of inorganic fibers closely wound around the inner layer. The inner and outer layers are impregnated with a thermosetting resin, or a mixture thereof with a fine inorganic powder.

The elastomeric material layer is formed around the reinforcing layer.

The fine inorganic powder in the reinforcing layer, such as glass beads, has a significant bearing on the improvements of the properties of the elastomeric material covered roll according to this invention, particularly its compressive and breaking strength, leading to a remarkable improvement in its durability, as will hereinafter be described in detail. The nonwoven fabric in the reinforcing layer plays an important role in maintaining the inorganic powder in a uniformly distributed condition throughout the layer.

The reinforcing layer in the elastomeric material covered roll of this invention retains a very high degree of hardness, and does not include fibers extending in a particular directional orientation. It hardly develops any detrimental crack even when the roll is rotated at a high speed under a heavy load. Even if some fine cracks develop, they do not substantially grow and spread over a wide area. Accordingly, the roll of this invention can maintain a firm connection between the reinforcing layer and the elastomeric material layer for a long period of time, and ensures a remarkably improved durability, as compared with any roll known in the art.

This invention is particularly useful when applied to a medium-sized or larger roll having a roll core with a diameter of at least 25 cm and a length of at least 2 m. In other words, this invention most effectively provides a medium-sized or larger roll for use at a high speed of rotation under a heavy load, and more particularly, a roll for use in papermaking.

According to a further aspect of this invention, there is provided a method which facilitates the manufacture of the elastomeric material covered rolls as hereinabove described. According to the method of this invention, a nonwoven fabric in the form of a tape impregnated with a thermosetting resin is wound tightly under tension about the whole outer surface of a roll core, while the roll core is being rotated about its own axis. After the thermosetting resin is hardened to form a reinforcing layer, a layer of elastomeric material is formed around the reinforcing layer in a customary manner.

In the event the reinforcing layer includes a first reinforcing layer formed by a cloth of inorganic fibers impregnated with a thermosetting resin, and rovings of inorganic fibers impregnated with a thermosetting resin, the cloth is wound under tension about the roll core, and the rovings are wound tightly about the cloth, while the roll core is being rotated, before the nonwoven fabric forming a second reinforcing layer is wound. Then, the nonwoven cloth is wound about the rovings before the thermosetting resin in the first layer has hardened.

The aforementioned and other objects and advantages of this invention will become apparent from a reading of the detailed description of the preferred embodiments taken in view of the accompanying drawings.

DETAILED DESCRIPTION OF THE PREFERRED EMBODIMEMTS

Figure 1:
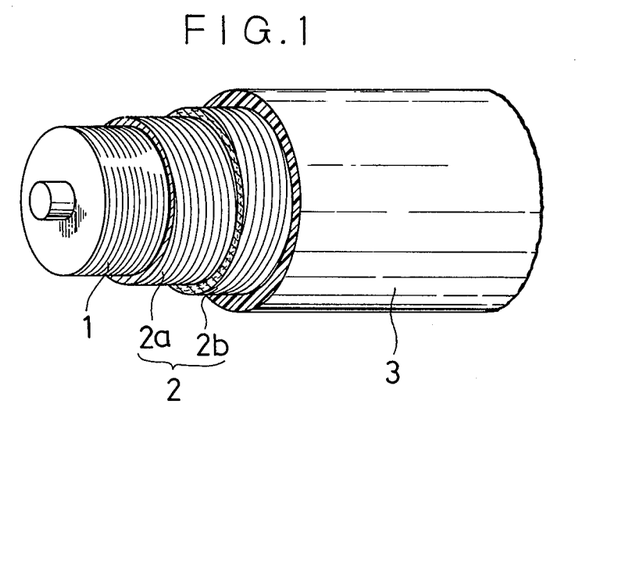
FIG. 1 is a partial perspective view of the elastomeric material covered roll embodying this invention.
Figure 2:
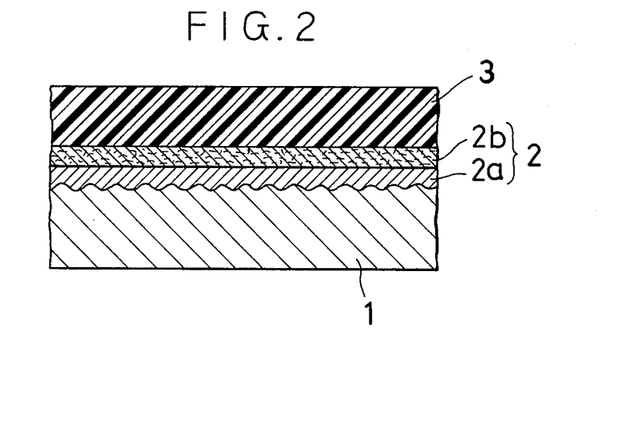
FIG. 2 is a fragmentary, enlarged sectional view of the roll shown in FIG. 1.

Referring first to FIGS. 1 and 2 of the drawings, the elastomeric material covered roll embodying this invention includes a roll core 1 made of a metal, such as iron, copper, aluminum or stainless steel, and having a roughened outer peripheral surface. The roughening of the outer surface is preferably achieved by a multiplicity of substantially parallel grooves formed about the circumference of the roll core 1. Any other means is, however, applicable for roughening the outer surface, if it ensures firm adherence of a reinforcing layer to the whole outer peripheral surface of the roll core 1.

The reinforcing layer 2 is impregnated with a thermosetting resin, and formed about the outer surface of the roll core 1. The reinforcing layer 2 comprises a first layer 2a and a second layer 2b. The first reinforcing layer 2a is formed by a cloth of inorganic fibers impregnated with a thermosetting resin, such as an epoxy or unsaturated polyester resin, and/or other liquid resins which can be hardened under heat or at room temperature, and has a thickness of about 0.5 to 3.0 mm, preferably about 1.0 to 2.0 mm. The first reinforcing layer 2a is provided particularly for preventing the development of any crack in the reinforcing layer 2 in the boundary between the roll core 1 and the reinforcing layer 2. In this connection, the cloth forming the first layer 2a should be made of hard and highly elastic inorganic fibers, such as glass fibers, carbon fibers, metal fibers or asbestos fibers. It is not suitable to use organic fibers. The layer should be formed as a cloth. The use of rovings or yarns is unsuitable, because they form a mass of fibers extending in a particular direction which is likely to cause the reinforcing layer to crack. It is, however, desirable to wind rovings or yarns about the cloth layer to form the first reinforcing layer, since they improve the compressive strength of the layer and add to its durability.

For the resin with which the first reinforcing layer is impregnated, it is preferable to use a thermosetting resin which is hardenable at an elevated temperature, from the standpoint of both manufacture and use of the roll. Particularly preferred is an epoxy resin which can be hardened at a temperature of, say, 80° C. to 100° C. Preferred hardener of an epoxy resin is an aromatic polyamine.

The second reinforcing layer 2b is formed by a nonwoven fabric impregnated with a mixture of such a thermosetting resin as hereinabove mentioned, and a fine inorganic powder, and has a thickness of about 3 to 15 mm, preferably about 5 to 10 mm. The presence of the inorganic powder distributed substantially uniformly in the second reinforcing layer 2b provides the layer with a very high degree of hardness, so that the layer has little residual strain, and will not crack on the surface, even if it is repeatedly placed under a heavy load. Accordingly, a remarkably improved degree of adhesion can be achieved between the reinforcing layer and a layer of elastomeric material formed around it, and ensures several times as high a peeling strength as the elastomeric material layer in any roll known in the art. Thus, the second reinforcing layer 2b very advantageously provides the roll of this invention with at least several times as high a degree of durability as any known roll.

Specific examples of the inorganic powder which can be used to form the second reinforcing layer 2b include glass beads, clay powder, silica powder, and mixtures thereof. The use of glass beads is particularly preferable. The inorganic powder preferably has an average particle diameter of 10 to 200 microns, and more preferably 20 to 100 microns. Any larger particle diameter makes it difficult to distribute the powder uniformly in the nonwoven fabric, and is likely to develop unevenness in the hardness of the layer 2b, while a powder having any smaller particle diameter is difficult to obtain, and expensive. It is advantageous to use an inorganic powder having a particle shape which is as close to spherical as possible, in order to improve its distribution in the nonwoven fabric, and the hardness and compressive strength of the resulting reinforcing layer.

It is preferable to use the same thermosetting resin in the second reinforcing layer as in the first layer.

The second reinforcing layer 2b contains 1.2–5, preferably about 2.5 volumes of the inorganic powder per volume of the nonwoven fabric without the thermosetting resin. The nonwoven fabric containing such a desired proportion of the inorganic powder may, for example, be obtained if it is immersed in an appropriately controlled mixture of the resin and the inorganic powder, and then passed between a pair of appropriately spaced squeezing rolls. The appropriate spacing between the rolls is, for example, 1.5 mm plus or minus 0.1 mm, when squeezing a nonwoven fabric made by stitching and having a unit weight of 120 g/m$^2$.

The inorganic powder in the mixture should have a weight proportion which is 0.5 to 2.0 times as large as the resin, and more preferably which is nearly equal to the resin with a certain range of small allowances, in the event glass beads are used. Any smaller amount of the powder may fail to provide the reinforcing layer 2b with a satisfactory degree of hardness which is 90 ±3 on a Shore D hardness tester, while any excess of the powder increases the viscosity of the mixed solution which it forms with the resin, to the extent that it is difficult to impregnate the nonwoven fabric with the solution.

In addition to the nonwoven fabric formed by stitching as noted above, it is possible to use one formed by needle punching, or one formed by stitching or needle punching to which an adhesive is applied for preventing fluffing. The fabric may be of either organic or inorganic fibers. Specifically, it is possible to use polyester or nylon fibers by way of example. The nonwoven fabric is required to have a sufficient tensile strength to withstand the tension under which it is placed when wound about the first reinforcing layer 2a, and yet, it must be capable of quick and uniform impregantion with the mixture of the resin and the inorganic powder. In view of these requirements, it is necessary to use a nonwoven fabric having a thickness of about 0.5 to 2.0 mm, and a unit weight of about 50 to 200 g/m$^2$.

The layer of elastomeric material 3, which is formed about the reinforcing layer 2, is usually secured thereto by an adhesive layer not shown. Suitable examples of the elastomeric material include polyurethane rubber, silicone rubber, polychloroprene rubber, chlorosulfonated polyethylene, butyl rubber, acrylonitrile-butadiene rubber, styrene-butadiene rubber, ethylene-propylene-cyclopentadiene copolymer, and natural rubber. If, for example, polyurethane rubber is employed, the layer 3 usually has a thickness of about 10 to 20 mm.

For the adhesive layer not shown, it is preferable to use an adhesive sharing a constituent with the elastomeric material forming the layer 3. For example, it is preferable to use an isocyanate adhesive if polyurethane rubber is employed for the layer 3.

Although the foregoing description has referred to the first reinforcing layer 2a as being impregnated solely with a thermosetting or curable resin, it is equally possible in accordance with this invention to have the first reinforcing layer 2a impregnated with a mixture of a thermosetting resin and an inorganic powder, as the second reinforcing layer 2b is.

Figure 3:
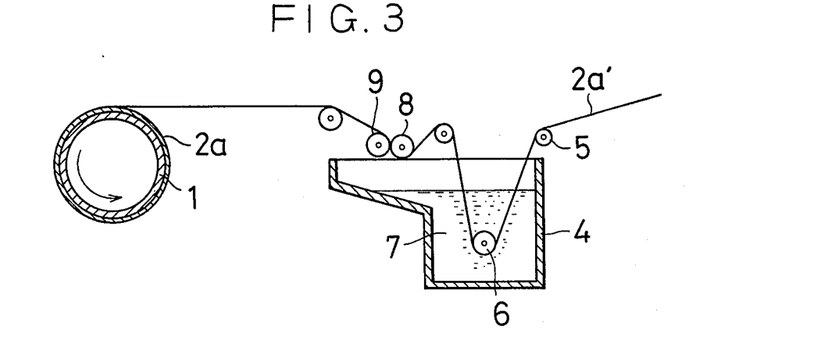
FIG. 3 is a view illustrating the process in which a reinforcing layer is formed about a roll core for the manufacture of the roll shown in FIG. 1.
Figure 4:
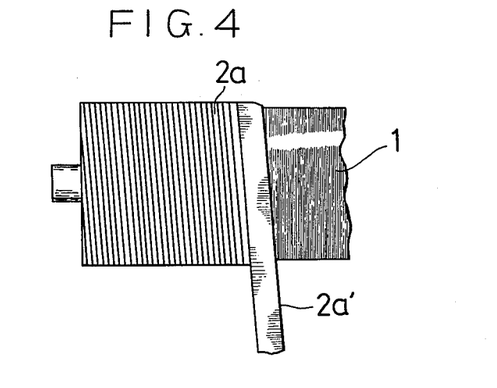
FIG. 4 is a view illustrating the process in which a cloth of inorganic fibers in the form of a tape is wound about a roll core for the manufacture of the roll shown in FIG. 1.
Figure 5:
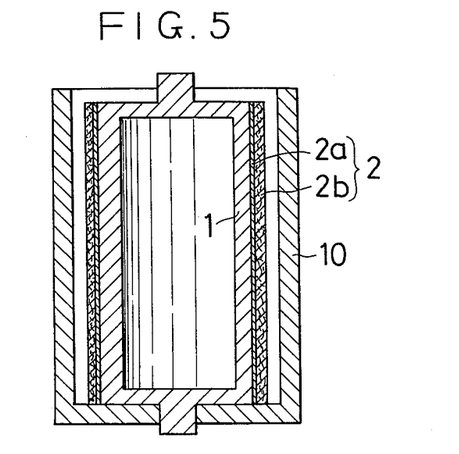
FIG. 5 is a front, longitudinal sectional view showing the process in which a layer of polyurethane rubber is cast during the manufacture of a polyurethane rubber covered roll according to this invention.

Attention is now directed to FIGS. 3 to 5 of the drawings which illustrate the steps involved in the method of manufacturing a roll according to this invention. A metallic roll core 1 is rotated in the direction of the arrow in FIG. 3 during the formation of a reinforcing layer 2. The fibrous material from which the reinforcing layer 2 is formed is introduced into a resin tank 4, impregnated therein with a resin solution or a mixture of a resin and an inorganic powder, and progressively wound about the roll core 1 in accordance with the arrangements as hereinbefore described, whereby the reinforcing layer 2 is formed about the roll core 1.

Figure 6:
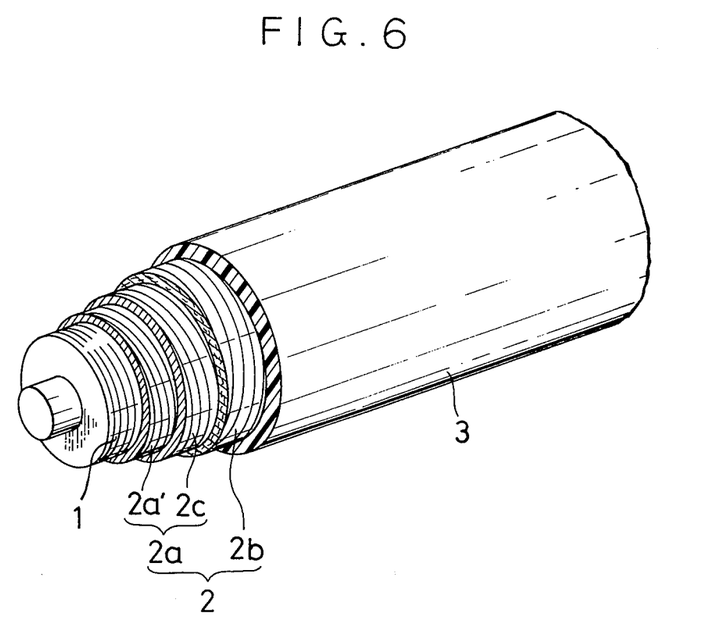
FIG. 6 is a partial perspective view of another elastomeric material covered roll embodying this invention.

Referring more specifically to FIG. 3, there is shown a process in which a cloth of inorganic fibers 2a' in the form of a tape is carried by a guide roller 5, and introduced into a resin solution 7 by an immersion roll 6 in the tank 4, and after it has been impregnated with the resin solution, the cloth 2a' is passed between a pair of squeezing rolls 8 and 9 to release any resin solution in excess of a predetermined quantity, and wound spirally about the outer surface of the roll core 1, whereby the first reinforcing layer 2a is formed. If it is desired to further improve the compressive strength of the reinforcing layer 2a, it is possible to wind rovings of inorganic fibers 2c about the cloth of inorganic fibers 2a', as illustrated in FIG. 6, by following the same procedures as hereinabove described.

The same procedures may be repeated for forming a second reinforcing layer 2b, except that a nonwoven fabric in the form of a tape is impregnated with a mixture of a thermosetting resin and an inorganic powder in the tank 4.

Both of the tapes of the cloth and the nonwoven fabric are usually wound spirally in such a manner that each tape may have a progressively overlapping longitudinal edge when wound about the roll core, and the convolutions of the tape are substantially parallel to each other and extend substantially perpendicular to the longitudinal axis of the roll core. See FIG. 4. A certain strength of tension is applied to each tape when it is wound about the roll core. The strength of the tension is appropriately selected, so that the fibrous material may be able to contain a predetermined quantity of the resin or its mixture with the inorganic powder, and wound as tightly as possible about the roll core. If the tape has a width of 60 mm, for example it would be suitable to place it under the tension of 5 to 10 kg.

The intermediate roll product on which the reinforcing layer 2 has been formed as hereinabove described is heated, or allowed to stand at room temperature, so that the resin contained therein may be hardened. Then, the reinforcing layer preferably has its surface smoothened by cutting or grinding, and an adhesive is applied to its surface, if required.

A layer of elastomeric material is, then, formed around the reinforcing layer 2. If polyurethane rubber is, for example, employed to form the layer 3, the intermediate roll product is placed in the center of a cavity in a cylindrical mold 10 as shown in FIG. 5, and polyurethane rubber is cast into the space between the mold 10 and the reinforcing layer 2. After the rubber has been hardened, the roll product is removed from the mold 10.

Finally, the surface of the elastomeric material layer 3 formed as hereinabove described is polished evenly to provide a diameter required of the roll, whereby an elastomeric material covered roll is obtained.

A layer of elastomeric material can also be formed if a sheet of unvulcanized rubber is applied about the reinforcing layer with an adhesive, and vulcanized.

The method of this invention will now be described in further detail with reference to several examples thereof.

EXAMPLE 1

A polyurethane rubber covered roll was manufactured from the following materials in accordance with the following procedures:

Roll core—A 906 mm dia. and 5,500 mm long cast iron cylinder having a surface formed with a multiplicity of grooves at intervals of about 3 mm;

Cloth of inorganic fibers—A tape of glass fiber cloth (ECM-200-65 of Unitika Ltd., Japan) having width of 60 mm;

Curable resin—An epoxy resin (a mixed solution containing 100 parts by weight of Araldite GY-252-100 and 23 parts by weight of a hardener of HY 974 J—Ciba Geigy Japan Ltd.);

Nonwoven fabric—A tape of nonwoven fabric made by stitching webs of polyester fibers with nylon threads, and having a width of 80 mm and a unit weight of 120 g/m² (Bonyarn C-3512T of Nippon Nonwoven Fabric Co., Ltd., Japan); and

In organic powder—Glass beads having an average particle diameter of 100 microns (GB 731 B of Toshiba Ballotini Co., Ltd., Japan)

The tape of glass fiber cloth was impregnated with the epoxy resin, and wound about the degreased and cleaned surface of the roll core at a pitch of 10 mm under a tension of 10 kg, whereby a first reinforcing layer having a thickness of 1.0 mm was formed. The tape of nonwoven fabric was impregnated with a uniform mixture containing equal proportions by weight of the epoxy resin and the glass beads, and wound about the first reinforcing layer at a pitch of 10 mm, while a tension of 10 kg was maintained on the tape, whereby a second reinforcing layer having a thickness of 12.0 mm was formed. Both of the tapes were wound about the roll core while it was being rotated.

The roll core, on which the reinforcing layer had thus been formed, was heated at 80° C. for five hours, while it was being rotated at 10 rpm, whereby the reinforcing layer was hardened. The surface of the reinforcing layer was ground until it had an outside diameter of 926 mm.

Then, an isocyanate adhesive (Bond T10.T100 of Konishi K.K., Japan) was applied to the exposed surface of the reinforcing layer. The intermediate roll product thus obtained was vertically placed in the center of a cavity in a cylindrical mold. A solution of polyurethane elastomer for casting use which was composed of a defoamed mixture containing 100 parts of Adiplane L-167 (of E.I. du Pont) and 19.5 parts of 4,4'-methylenebisorthochloroaniline was cast into the space between the inner wall of the mold and the reinforcing layer on the intermediate product. The mold was heated at 100° C. for 15 hours, whereby the elastomer was hardened, and after the product was cooled to room temperature, it was removed from the mold, and its elastomer surface was ground to yield a roll having an outside diameter of 956 mm.

The polyurethane rubber covered roll thus obtained could be used for continuous rotation at a speed of 200 rpm and a linear pressure of 200 kg/cm for 200 hours as a press roll in a paper machine without presenting any problem.

EXAMPLE 2

A polyurethane rubber covered roll was manufactured from the following materials in accordance with the following procedures:

Roll core—A 355 mm dia. and 1,160 mm long cast iron cylinder having a surface formed with a multiplicity of grooves at intervals of about 2.5 mm;

Cloth of inorganic fibers—A tape of glass fiber cloth (EOL-300N of Nitto Boseki Co., Ltd., Japan) having a width of 60 mm;

Curable resin—An epoxy resin of the type as described in Example 1;

Nonwoven fabric—A tape of nonwoven fabric made by stitching webs of rayon fibers with nylon threads, and having a width of 80 mm and a unit weight of 200 g/m² (#900 of Kureha Fiber Co., Ltd., Japan); and Inorganic powder—Glass beads having an average particle diameter of 30 microns (GB 731 B of Toshiba Ballotini Co., Ltd., Japan).

The tape of glass fiber cloth was impregnated with the epoxy resin, and wound about the outer surface of the roll core at a pitch of 8 mm, while the roll core was being rotated and a tension of 8 kg was maintained on the tape, whereby a first reinforcing layer having a thickness of 1.2 mm was formed on the roll core. The tape of nonwoven fabric was impregnated with a uniform mixture of the epoxy resin and the glass beads having a resin to glass bead proportion by weight of 1:2, and wound about the first reinforcing layer at a pitch of 9 mm, while a tension of 8 kg was maintained on the tape, whereby a second reinforcing layer having a thickness of 7.8 mm was formed about the first reinforcing layer. The reinforcing layer thus formed was hardened in the same manner as described in Example 1, and its surface was ground until it had an outside diameter of 367 mm.

A layer of polyurethane rubber was formed about the reinforcing layer by casting in the same manner as described in Example 1. After the product was removed from the mold, its rubber surface was ground to yield a roll having an outside diameter of 395 mm.

The roll thus obtained was as durable as the product of Example 1.

EXAMPLE 3

A polyurethane rubber covered roll was manufactured from the following materials in accordance with the following procedures:

Roll core—A 600 mm dia. and 3,570 mm long stainless steel cylinder having a surface formed with a multiplicity of grooves at intervals of about 3 mm;

Cloth of inorganic fibers—A tape of the same type as described in Example 1;

Curable resin—An unsaturated polyester resin (a mixed solution of 100 parts of Polylite 8027, and 2 parts of Polyoxide RM, product of Dai-Nippon Ink and Chemicals, Inc., Japan);

Nonwoven fabric—A tape of the same type as described in Example 1; and

Inorganic powder—Glass beads having an average particle diameter of 150 microns (GB 731 B of Toshiba Ballotini Co., Ltd., Japan).

The tape of glass fiber cloth was impregnated with the unsaturated polyester resin, and wound about the outer surface of the roll core at a pitch of 8 mm, while the roll core was being rotated, and a tension of 5 kg was maintained on the tape, whereby a first reinforcing layer having a thickness of 1 mm was formed on the roll core. The tape of nonwoven fabric was impregnated with a uniform mixture of the unsaturated polyester resin and the glass beads having a resin to glass bead proportion by weight of 1:0.5, and wound about the first reinforcing layer in the same manner as the first layer had been wound on the roll core, whereby a second reinforcing layer having a thickness of 12 mm was formed. The reinforcing layer thus formed was hardened in the same manner as described in Example 1, and its surface was ground until it had an outside diameter of 620 mm.

A layer of polyurethane rubber was formed about the reinforcing layer by casting in the same manner as described in Example 1. After the product was removed from the mold, its rubber surface was ground to yield a roll having an outside diameter of 650 mm.

The roll thus obtained was as durable as the product of Example 1.

EXAMPLE 4

A polyurethane rubber covered roll was manufactured from the following materials in accordance with the following procedures:

Roll core—A copper cylinder having a diameter of 310 mm and a length of 1,370 mm, formed on its surface with a multiplicity of grooves at intervals of 3 mm;
Cloth of inorganic fibers—A tape of the same type as described in Example 2;
Curable resin—An unsaturated polyester resin of the same type as described in Example 3;
Nonwoven fabric—A tape of the same type as described in Example 2; and
Inorganic power—Clay having an average particle diameter of 80 microns (NN Kaolin Clay of Tsuchiya Kaolin Kogyo K.K., Japan).

The tape of glass fiber cloth was impregnated with the unsaturated polyester resin, and wound about the outer surface of the roll core at a pitch of 8 mm, while the roll core was being rotated, and a tension of 8 kg was maintained on the tape, whereby a first reinforcing layer having a thickness of 1 mm was formed on the roll core. The tape of non-woven fabric was impregnated with a uniform mixture of the unsaturated polyester resin and the clay powder having a resin to clay proportion by weight of 1:0.8, and wound about the first reinforcing layer in the same manner as the first layer had been wound about the roll core, whereby a second reinforcing layer having a thickness of 10 mm was formed. Then, the procedures of Example 3 were repeated for hardening the reinforcing layer, grinding its surface, forming a layer of polyurethane rubber by casting, and grinding its surface, whereby a roll having an outside diameter of 350 mm was obtained.

The roll thus obtained was as durable as that of Example 1.

EXAMPLE 5

A polyurethane rubber covered roll was manufactured from the following materials in accordance with the following procedures:

Roll core—An aluminum cylinder having a diameter of 660 mm and a length of 3,900 mm, and formed on its surface with a multiplicity of grooves at intervals of about 3 mm;
Cloth of inorganic fibers—A tape of glass fiber cloth of the same type as described in Example 1;
Curable resin—An epoxy resin of the same type as described in Example 1;
Nonwoven fabric—A tape of nonwoven fabric of the same type as described in Example 2;
Inorganic powder—Silica powder having an average particle diameter of 100 microns (Imsil A-25 of Illinois Minerals).

The tape of glass fiber cloth was impregnated with the epoxy resin, and wound about the roll core at a pitch of 10 mm, while the roll core was being rotated, and a tension of 8 kg was maintained on the tape, whereby a first reinforcing layer having a thickness of 1 mm was formed on the roll core. The tape of nonwoven fabric was impregnated with a uniform mixture of the epoxy resin and the silica powder having a resin to silica powder proportion by weight of 1:1.5, and wound about the first reinforcing layer in the same manner as the first layer had been wound on the roll core, whereby a second reinforcing layer having a thickness of 8 mm was formed. Then, the procedures of Example 4 were repeated for hardening the reinforcing layer under heat, grinding its surface, forming a layer of polyurethane rubber by casting, and grinding its surface, whereby a roll having an outside diameter of 700 mm was obtained.

The roll thus obtained could be used for continuous operation for 200 hours at 200 rpm and 200 kg/cm as a presser roll for a paper machine, with its surface being supplied with water at room temperature, without presenting any problem at all.

EXAMPLE 6

A polyurethane rubber covered roll was manufactured from the following materials in accordance with the following procedures:

Roll core—A 520 mm dia. and 2,850 mm long cast iron cylinder having a surface formed with a multiplicity of grooves at appropriate intervals;
Curable resin—An epoxy resin (a mixed solution of 100 parts by weight of Araldite GY-252, and 23 parts by weight of a hardener, product of Ciba Geigy Japan Limited);
Nonwoven fabric—A tape of nonwoven fabric made by stitching webs of polyester fibers with nylon threads, and having a width of 80 mm and a unit weight of 120 g/m$^2$ (Bonyarn C-3512T of Nippon Nonwoven Fabric Co., Ltd., Japan); and
Inorganic powder—Glass beads having an average perticle diameter of 50 microns (GB 731B of Toshiba Ballotini Co., Ltd., Japan).

The tape of nonwoven fabric was impregnated with a uniformly mixed solution containing equal proportions by weight of the epoxy resin and the glass beads, and wound about the degreased and cleaned surface of the roll core at a pitch of 10 mm, while the roll core was being rotated, and a tension of 10 kg was maintained on the tape, whereby a reinforcing layer having a thickness of 10 mm was formed on the roll core.

The roll core, on which the reinforcing layer had thus been formed, was heated at 80° C. for five hours, while it was being rotated at a speed of 10 rpm, whereby the reinforcing layer was hardened. Then, the surface of the reinforcing layer was ground until it had an outside diameter of 534 mm.

An isocyanate adhesive (Bond T10.T100 of Konishi K.K., Japan) was applied to the exposed surface of the reinforcing layer.

The intermediate roll product thus obtained was vertically placed in the center of a cavity in a cylindrical mold, and a solution of polyurethane elastomer for casting use composed of a defoamed mixture containing 100 parts of Adiplane L-167 (of E. I. du Pont), and 19.5 parts of 4,4'-methylenebisorthochloroaniline was cast into the space between the inner wall of the mold and the reinforcing layer on the intermediate product. Then, the procedures of Example 1 were repeated to manufacture a polyurethane rubber covered roll.

EXAMPLE 7

A polyurethane rubber covered roll was prepared from the following materials in accordance with the following procedures:

Roll core—A 1,100 mm dia. and 9,000 mm long cast iron cylinder having a surface formed with a multiplicity of grooves at intervals of about 3 mm;

Cloth of inorganic fibers—A tape of glass fiber cloth having a width of 60 mm and a thickness of 0.2 mm (ECM-200-65 of Unitika Ltd., Japan);

Curable resin—An epoxy resin (a mixture of 100 parts by weight of Araldite Gy-252, and 23 parts by weight of a hardener, product of Ciba Geigy Japan Ltd.);

Glass rovings—Glass rovings made of 10 micron dia. glass filaments treated with a silane compound, and having a unit weight of 2,400 g/km (RS 240, PE-535 of Nitto Boseki Co., Ltd.);

Nonwoven fabric—A tape of nonwoven fabric made by stitching webs of polyester fibers with nylon threads, and having a width of 80 mm and a unit weight of 120 g/m$^2$ (Bonyarn C-3512T of Nippon Nonwoven Fabric Co., Ltd., Japan); and Inorganic powder—Glass beads having an average perticle diameter of 50 microns (GB 731B of Toshiba Ballotini Co., Ltd., Japan).

The tape of glass fiber cloth was immersed in a bath of the epoxy resin, and stretched between a pair of rolls having a clearance of 0.25 of 0.3 mm therebetween with a tension of 10 kg. The tape was, then, wound about the degreased and cleaned surface of the roll core at a pitch of 10 mm, so that the convolutions of the tape are substantially parallel to each other and extend substantially perpendicular to the longitudinal axis of the roll core, while the roll core was being rotated, and a tension of 10 kg was maintained on the tape, whereby a layer of glass fiber cloth having a thickness of 1.0 mm was formed on the roll core. Three bundles of glass rovings were impregnated with a mixture containing equal proportions of the epoxy resin and the glass beads by weight, and wound tightly about the layer of the glass fiber cloth in a helical fashion at a pitch of 2.5 mm per turn, while a tension of 10 kg was maintained on the rovings, whereby a 3.0 mm thick layer of glass rovings contacking closely one another was formed on the layer of the glass fiber cloth, and thus, a first reinforcing layer was formed. The tape of nonwoven fabric was immersed in a bath of a mixture containing equal proportions by weight of the epoxy resin and the glass beads, and stretched with a tension of 10 kg between a pair of rolls having a clearance of 1.5 mm ±0.1 mm therebetween. Then, the tape was wound about the first reinforcing layer at a pitch of 10 mm, so that the convolutions of the tape are substantially parallel to each other and extend substantially perpendicular to the longitudinal axis of the roll core, while a tension of 10 kg was maintained on the tape, whereby a second reinforcing layer having a thickness of 9.0 mm was formed.

The roll core, on which the first and second reinforcing layers had thus been formed, was heated at 80° C. for five hours, while it was being rotated at 10 rpm, whereby the reinforcing layers were hardened. The surface of the reinforcing layers was ground until the product had an outside diameter of 1,120 mm.

An isocyanate adhesive (Bond Ku661 and Ku662 of Konishi K.K., Japan) was applied to the exposed surface of the reinforcing layer. The procedures of Example 1 were, then, repeated for preparing a polyurethane rubber covered roll from the intermediate roll product obtained as hereinabove described.

The resultant rubber-covered roll was altogether satisfactory.

The following is a comparative example relating to the manufacture of a roll according to the prior art.

COMPARATIVE EXAMPLE

A polyurethane rubber covered roll was prepared from the following materials in accordance with the following procedures:

Roll core—A cast iron cylinder of the same type as used in Example 1;

Fibrous material—Glass rovings made of 9 micron dia. glass fibers; and

Curable resin—An epoxy resin of the same type as used in Example 1.

The glass rovings were impregnated with the epoxy resin, and wound about the roll core tightly, while a tension of 10 kg was maintained on the rovings, whereby a fibrous reinforcing layer having a thickness of 4 mm was formed. The reinforcing layer was heated at 80° C. for five hours, and hardened. After its surface was ground, a layer of polyurethane rubber having a thickness of 25 mm was formed about the reinforcing layer in the same manner as described in Example 1, whereby a polyurethane rubber covered roll was obtained.

When the roll thus obtained was used at 200 rpm, and 200 kg/cm, the fibrous reinforcing layer broke in less than about 30 hours, resulting in the stripping of the rubber layer.

Sample rolls were prepared from the same materials as described in Examples 1 to 7, and Comparative Example substantially in accordance with the procedures described therein, and their physical properties, particularly their mechanical strength, were measured. The results are shown in the table below.

| | Comparison of Physical Properties | | |
|---|---|---|---|
| | Peeling resistance (kg/cm) | Compressive breaking strength (kg) | Repetitive compressive strength (740 kg/cm) |
| Example 1 | 25-30 | 3,980 | No change |
| Example 2 | 25-30 | 4,500 | No change |
| Example 3 | 25-30 | 2,900 | No change |
| Example 4 | 25-30 | 3,200 | No change |
| Example 5 | 25-30 | 3,900 | No change |
| Example 6 | 25-30 | 1,900 | Permanent deformation of the nip |
| Example 7 | 25-30 | 4,000 | No change |
| Comparative Example | 3-5 | 3,900 | Whitening (formation of microcracks) |

The peeling resistance of each sample was determined by removing the polyurethane rubber layer from the reinforcing layer except for a thin, annular rubber layer portion having a thickness of 4 mm and a width of 10 mm, cutting it along the longitudinal axis of the roll, and attaching a spring balance to one of the cut ends by a jig. An annular sample consisting solely of a reinforcing layer, and having an inside diameter of 20 mm, an outside diameter of 30 mm and a width of 15 mm was prepared for the evaluation of the compressive breaking strength, and axially compressed until it broke. An iron roll core was inserted into the aforementioned annular reinforcing layer, and connected integrally therewith by adhesion to provide a sample for the evaluation of the repetitive compressive strength. A pressure of 740 kg/cm was applied to the sample repeatedly 10 to 15 times at a compression rate of 1 mm/min. in a direction perpendicular to the longitudinal axis of the roll core, and then, the surface of the reinforcing layer at the nip was visually inspected.

What is claimed is:

1. In an elastomeric material covered roll including a metallic roll core having a roughened surface, a fibrous reinforcing layer impregnated with a thermosetting resin and surrounding said roll core, and a layer of elastomeric material surrounding said reinforcing layer, the improvement wherein said reinforcing layer comprises at least one layer formed by a fabric comprised of nonwoven fibers, said fabric being impregnated with a mixture of said thermosetting resin and a fine inorganic powder, said last mentioned layer underlying said layer of elastomeric material and being united integrally therewith.

2. An elastomeric material covered roll as set forth in claim 1, wherein said elastomeric material is polyurethane rubber.

3. An elastomeric material covered roll as set forth in claim 1 or 2, wherein said reinforcing layer comprises a first reinforcing layer contacting said surface of said roll core and united integrally therewith, and a second reinforcing layer surrounding said first reinforcing layer, and having an outer surface united integrally with said layer of elastomeric material, said first reinforcing layer including at least one layer formed by a cloth of inorganic fibers impregnated with a thermosetting resin or with a mixture of said thermosetting resin with a fine inorganic powder, said second reinforcing layer being formed by said nonwoven fabric impregnated with a mixture of a thermosetting resin and a fine inorganic powder.

4. An elastomeric material covered roll as set forth in claim 3, wherein said first reinforcing layer comprises (1) said layer formed by said cloth of inorganic fibers, said cloth having been impregnated with a thermosetting resin or with a mixture of a thermosetting resin and a fine inorganic powder, said impregnated cloth contacting said surface of said roll core and being united integrally therewith, and (2) a layer formed by rovings of inorganic fibers being closely and tightly wound about said cloth, said rovings having been impregnated with a thermosetting resin or with a mixture of a thermosetting resin and a fine inorganic powder.

5. An elastomeric material covered roll as set forth in claim 4, wherein said rovings are composed of glass fibers.

6. An elastomeric material covered roll as set forth in claim 5, wherein said cloth is comprised of glass fibers.

7. An elastomeric material covered roll as set forth in claim 6, wherein said thermosetting resin is an epoxy resin.

8. An elastomeric material covered roll as set forth in claim 7, wherein said inorganic powder comprises at least one substance selected from the group consisting of glass beads, clay powder and silica powder having an average particle diameter of 10 to 200 microns.

9. An elastomeric material covered roll as set forth in claim 7, wherein said inorganic powder comprises glass beads having an average particle diameter of 10 to 200 microns.

10. An elastomeric material covered roll as set forth in claim 9, wherein said thermosetting resin and said inorganic powder in said mixture have a proportion by weight of 1:0.5 to 1:2.0.

11. An elastomeric material covered roll as set forth in claim 10, wherein said layer formed by said nonwoven fabric contains about 2.5 volumes of said inorganic powder per volume of said nonwoven fabric.

12. An elastomeric material covered roll as set forth in claim 11, wherein said nonwoven fabric has a unit weight of about 50 to 200 g/m$^2$.

13. An elastomeric material covered roll as set forth in claim 12, further including an adhesive layer between said fibrous reinforcing layer and said layer of elastomeric material.

14. An elastomeric material covered roll as set forth in claim 13, wherein said elastomeric material is polyurethane rubber, and wherein said adhesive comprises a constituent that is also present in said polyurethane rubber.

15. A method of making an elastomeric material covered roll, comprising:

impregnating a nonwoven fabric in the form of a tape with a mixture of thermosetting resin and a fine inorganic powder winding said nonwoven fabric tightly about a metallic roll core having a roughened outer surface, while rotating said roll core, and maintaining said nonwoven fabric under tension;

hardening said resin, whereby a reinforcing layer is formed about said roll core; and forming a layer of elastomeric material about said reinforcing layer.

16. A method as set forth in claim 15, further including, prior to said winding of said nonwoven fabric:

impregnating a cloth of inorganic fibers in the form of a tape with a thermosetting resin or mixture thereof with a fine inorganic powder; and winding said cloth tightly about said outer surface of said roll core, while maintaining said cloth under tension.

17. A method as set forth in claim 16, further including, after said winding of said cloth:

impregnating rovings of inorganic fibers with a thermosetting resin, or a mixture thereof with a fine inorganic powder; and winding closely and tightly said rovings about said cloth, while maintaining said rovings under tension.

18. A method as set forth in claim 17, further including, after said hardening, cutting or grinding an exposed surface of said reinforcing layer.

19. A method as set forth in claim 18, further including, prior to said forming of said layer of elastomeric material, applying an adhesive to an exposed surface of said reinforcing layer.

20. A method as set forth in claim 16 or 17, wherein said cloth is wound about said outer surface of said roll core in such a manner that the convolutions of said cloth are substantially parallel to each other, extend substantially perpendicular to the longitudinal axis of said roll core, and have a longitudinal edge overlapping the adjacent longitudinal edge of the immediately preceding turn.

21. A method as set forth in 17 or 20, wherein said rovings are helically wound about said cloth so closely that they contact one another.

22. A method as set forth in claim 17, wherein said nonwoven fabric is wound around said roll core in such a manner that the convolutions of said fabric are substantially parallel to each other, extend substantially perpendicular to the longitudinal axis of said roll core, and have a longitudinal edge overlapping an adjacent longitudinal edge of the immediately preceding turn.

23. A method as set forth in claim 22, wherein said elastomeric material is polyurethane rubber.

* * * * *